US009632825B2

(12) United States Patent
Chan

(10) Patent No.: US 9,632,825 B2
(45) Date of Patent: Apr. 25, 2017

(54) METHOD AND APPARATUS FOR EFFICIENT SCHEDULING FOR ASYMMETRICAL EXECUTION UNITS

(71) Applicant: Intel Corporation, Santa Clara, CA (US)

(72) Inventor: Nelson N. Chan, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 413 days.

(21) Appl. No.: 14/107,116

(22) Filed: Dec. 16, 2013

(65) Prior Publication Data

US 2014/0373022 A1    Dec. 18, 2014

Related U.S. Application Data

(60) Provisional application No. 61/799,062, filed on Mar. 15, 2013.

(51) Int. Cl.
*G06F 9/48* (2006.01)
*G06F 9/38* (2006.01)

(52) U.S. Cl.
CPC .......... *G06F 9/4881* (2013.01); *G06F 9/3836* (2013.01); *G06F 9/3875* (2013.01)

(58) Field of Classification Search
None
See application file for complete search history.

(56) References Cited

U.S. PATENT DOCUMENTS 4,727,487 A * 2/1988 Masui ................ G06F 9/50
706/52
5,404,470 A   4/1995 Miyake
(Continued)

FOREIGN PATENT DOCUMENTS

CN   1841314    10/2006
TW   544626     8/2003
(Continued)

OTHER PUBLICATIONS

Mogul et al; ""Potential benefits of delta encoding and data compression for HTTP""; Oct. 1, 1997; ACM; SIGCOMM 97; pp. 181-194.

*Primary Examiner* — Emerson Puente
*Assistant Examiner* — Zhi Chen
(74) *Attorney, Agent, or Firm* — Nicholson De Vos Webster & Elliott LLP

(57) ABSTRACT

A method for performing instruction scheduling in an out-of-order microprocessor pipeline is disclosed. The method comprises selecting a first set of instructions to dispatch from a scheduler to an execution module, wherein the execution module comprises two types of execution units. The first type of execution unit executes both a first and a second type of instruction and the second type of execution unit executes only the second type. Next, the method comprises selecting a second set of instructions to dispatch, which is a subset of the first set and comprises only instructions of the second type. Next, the method comprises determining a third set of instructions, which comprises instructions not selected as part of the second set. Finally, the method comprises dispatching the second set for execution using the second type of execution unit and dispatching the third set for execution using the first type of execution unit.

17 Claims, 6 Drawing Sheets

(56) References Cited

U.S. PATENT DOCUMENTS

| | | | |
|---|---|---|---|
| 5,724,565 A | 3/1998 | Dubey et al. | |
| 5,751,982 A | 5/1998 | Morley | |
| 5,761,476 A | 6/1998 | Martell | |
| 5,819,088 A | 10/1998 | Reinders | |
| 5,911,057 A | 6/1999 | Shiell | |
| 6,216,215 B1 | 4/2001 | Palanca et al. | |
| 6,308,323 B1 | 10/2001 | Douniwa | |
| 6,345,357 B1 | 2/2002 | Sato | |
| 6,490,673 B1 | 12/2002 | Heishi et al. | |
| 6,529,928 B1* | 3/2003 | Resnick | G06F 7/485 708/495 |
| 6,557,095 B1 | 4/2003 | Henstrom | |
| 6,668,316 B1* | 12/2003 | Gorshtein | G06F 9/3001 712/221 |
| 6,704,860 B1 | 3/2004 | Moore | |
| 6,948,172 B1 | 9/2005 | D'Souza et al. | |
| 7,020,879 B1* | 3/2006 | Nemirovsky | G06F 9/4818 712/23 |
| 7,707,578 B1 | 4/2010 | Zedlewski | |
| 7,757,065 B1 | 7/2010 | Jourdan et al. | |
| 8,044,951 B1* | 10/2011 | Brown | G06F 8/54 345/419 |
| 8,046,775 B2 | 10/2011 | Kang | |
| 8,145,882 B1 | 3/2012 | Kishore et al. | |
| 8,200,949 B1 | 6/2012 | Tarjan et al. | |
| 8,539,486 B2 | 9/2013 | Cain | |
| 2002/0029308 A1 | 3/2002 | Babaian et al. | |
| 2002/0062435 A1* | 5/2002 | Nemirovsky | G06F 9/3851 712/7 |
| 2003/0093776 A1 | 5/2003 | Hilton | |
| 2003/0233394 A1 | 12/2003 | Rudd | |
| 2004/0078538 A1 | 4/2004 | Dutt et al. | |
| 2004/0098567 A1 | 5/2004 | Hansen | |
| 2004/0158822 A1 | 8/2004 | Sandham et al. | |
| 2004/0187123 A1 | 9/2004 | Tremblay | |
| 2005/0114603 A1 | 5/2005 | Buti et al. | |
| 2005/0120194 A1 | 6/2005 | Kissell | |
| 2005/0289530 A1 | 12/2005 | Robison | |
| 2006/0161921 A1 | 7/2006 | Kissell | |
| 2006/0179257 A1 | 8/2006 | Chu | |
| 2006/0179281 A1 | 8/2006 | Jensen et al. | |
| 2006/0212687 A1 | 9/2006 | Chen | |
| 2006/0230243 A1 | 10/2006 | Cochran et al. | |
| 2006/0230409 A1 | 10/2006 | Frigo | |
| 2006/0282839 A1 | 12/2006 | Hankins et al. | |
| 2007/0006231 A1 | 1/2007 | Wang et al. | |
| 2007/0198665 A1 | 8/2007 | De Matteis et al. | |
| 2008/0016507 A1 | 1/2008 | Thomas et al. | |
| 2008/0104598 A1 | 5/2008 | Chang | |
| 2008/0148237 A1 | 6/2008 | Jiang et al. | |
| 2008/0250227 A1 | 10/2008 | Linderman | |
| 2008/0320476 A1 | 12/2008 | Wingard | |
| 2009/0019264 A1 | 1/2009 | Correale, Jr. et al. | |
| 2009/0113170 A1 | 4/2009 | Abdallah | |
| 2009/0138670 A1 | 5/2009 | Mutlu et al. | |
| 2009/0150647 A1 | 6/2009 | Mejdrich et al. | |
| 2009/0165007 A1 | 6/2009 | Aghajanyan | |
| 2009/0282101 A1 | 11/2009 | Lim | |
| 2009/0307450 A1 | 12/2009 | Lee | |
| 2009/0328053 A1 | 12/2009 | Dice | |
| 2010/0100690 A1 | 4/2010 | Rajamani | |
| 2010/0115244 A1 | 5/2010 | Jensen et al. | |
| 2010/0154042 A1 | 6/2010 | Miyamoto | |
| 2010/0161948 A1 | 6/2010 | Abdallah | |
| 2010/0205603 A1 | 8/2010 | Merten et al. | |
| 2010/0280996 A1 | 11/2010 | Gross, IV et al. | |
| 2010/0286976 A1 | 11/2010 | Gao et al. | |
| 2010/0299671 A1 | 11/2010 | Kinsey | |
| 2010/0306503 A1* | 12/2010 | Henry | G06F 9/30032 712/207 |
| 2010/0325394 A1 | 12/2010 | Golla et al. | |
| 2011/0055479 A1 | 3/2011 | West | |
| 2011/0067016 A1 | 3/2011 | Mizrachi et al. | |
| 2011/0093857 A1 | 4/2011 | Sydow | |
| 2012/0023318 A1 | 1/2012 | Xing et al. | |
| 2012/0066483 A1* | 3/2012 | Boury | G06F 12/0875 712/233 |
| 2012/0089812 A1 | 4/2012 | Smith | |
| 2012/0246450 A1 | 9/2012 | Abdallah | |
| 2013/0036296 A1* | 2/2013 | Hickey | G06F 9/30014 712/222 |
| 2013/0283286 A1* | 10/2013 | Lee | G06F 9/5027 718/104 |
| 2014/0181833 A1 | 6/2014 | Bird | |
| 2014/0281411 A1 | 9/2014 | Abdallah | |
| 2014/0281412 A1 | 9/2014 | Abdallah | |
| 2014/0281416 A1 | 9/2014 | Abdallah | |
| 2014/0281426 A1 | 9/2014 | Abdallah | |
| 2014/0281427 A1 | 9/2014 | Abdallah | |
| 2014/0281428 A1 | 9/2014 | Abdallah | |
| 2014/0281436 A1 | 9/2014 | Abdallah | |
| 2014/0282592 A1 | 9/2014 | Abdallah | |
| 2014/0282601 A1 | 9/2014 | Abdallah | |
| 2014/0317387 A1 | 10/2014 | Abdallah | |
| 2015/0046683 A1 | 2/2015 | Abdallah | |
| 2015/0046686 A1 | 2/2015 | Abdallah | |

FOREIGN PATENT DOCUMENTS

| | | |
|---|---|---|
| TW | 200422949 | 11/2004 |
| TW | 200813766 | 3/2008 |
| TW | 200949690 | 12/2009 |
| TW | I329437 | 8/2010 |
| TW | I331282 | 10/2010 |
| TW | I352288 | 11/2011 |
| TW | 201227520 | 7/2012 |
| TW | 201241744 | 10/2012 |
| TW | 201305819 | 2/2013 |
| WO | 2010049585 | 5/2010 |

* cited by examiner

| Entry Status | Find 8 Count | Find 4 Count | Mask for A (A only) | Mask for E (not X and not picked for A) |
|---|---|---|---|---|
| A | 0 | 0 | 1 | 0 |
| A | 1 | 1 | 1 | 0 |
| E | 2 | 1 | 0 | 1 |
| E | 3 | 1 | 0 | 1 |
| A | 4 | 2 | 1 | 0 |
| X | 4 | 2 | 0 | 0 |
| X | 4 | 2 | 0 | 0 |
| X | 4 | 2 | 0 | 0 |
| E | 5 | 3 | 0 | 1 |
| A | 6 | 4 SAT 4 | 1 | 0 |
| A | 7 | 4 SAT 4 | 1 | 1 |
| X | 7 | 5 SAT 4 | 0 | 0 |
| A | 8 | 6 SAT 4 | 1 | 1 |
| A | 9 | 6 SAT 4 | 1 | 1 |
| E | 10 | 6 SAT 4 | 1 | 1 |

A = A type instruction
E = E type instruction
X = Instruction with ready bit not set

FIG. 5

METHOD AND APPARATUS FOR EFFICIENT SCHEDULING FOR ASYMMETRICAL EXECUTION UNITS

CROSS REFERENCE TO RELATED APPLICATIONS

This application is a conversion of and claims priority to and the benefit of Provisional Patent Application No. 61/799,062, entitled "METHOD AND APPARATUS FOR EFFICIENT SCHEDULING FOR ASYMMETRICAL EXECUTION UNITS," having a filing Date of Mar. 15, 2013, which is herein incorporated by reference in its entirety.

FIELD OF THE INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue and execute out of their program order. The scheduler of an OOO microprocessor selects and dispatches ready instructions out of order into execution units. Certain microprocessor architectures have two types of instructions, A and E. Examples of A-type instruction are integer operations such as add and subtract while examples of E-type instructions are floating point operations such as floating point add, floating point subtract, and floating point multiply. However, it should be noted that A and E-type of instructions are not solely limited to the above examples.

Conventional architectures that support two types of instructions, however, do not have execution units that can support both types of instructions. For example, a conventional processor will typically have an exclusive execution unit for executing A-type instructions and an exclusive unit for processing E-type instructions, wherein both types of execution units would be mutually exclusive from each other.

The objective of the scheduler in such an architecture is typically to optimize the dispatch throughput given the non-uniform instruction type and the asymmetric execution units. Further, another objective of the scheduler is to prioritize older instructions over younger ones. And finally, the last objective is to maintain competitive latency in performing the scheduling procedure.

Conventional architectures are limited because they do not successfully accomplish all the aforementioned objectives. For example, as mentioned above, conventional architectures may adopt a primitive policy of selecting A-type instructions for execution in only A-type execution units and picking E-type instructions for execution in only E-type execution units. This allows execution to be conducted in parallel for better latency, but if there are not enough instruction blocks for the specific execution unit types, it will result in unused execution unit ports and less overall dispatch throughput.

For example, if there are 5 A-type instructions and 3 E-type instructions in an architecture with 4 A-type execution units and 4 E-type execution units, at least one of the E-type execution units will be idle because A-type instructions cannot be executed in E-type execution units. Another problem with this scheme is that it is age optimized only within the individual category (A or E) and not optimized for overall age prioritization. In the example above, for instance, only 7 instructions would be dispatched. The fifth A-type instruction would have to wait for the next cycle. As a result, conventional architectures are limited and not designed to accomplish all the aforementioned desired objectives of the scheduler.

BRIEF SUMMARY OF THE INVENTION

Accordingly, a need exists for a method and apparatus wherein an execution unit can execute multiple types of instructions, e.g., both A and E-types of instructions. Further, a need exists for a method and apparatus for more efficient scheduling for asymmetrical execution units, which optimizes dispatch throughput, prioritizes older instruction blocks over younger ones, and maintains a competitive latency.

Embodiments of the present invention support asymmetric execution unit types, A and E, wherein an A-type execution unit can support only A-type instructions, but an E-type execution unit can support both A and E-types of instructions. Accordingly, A-type instructions can be executed in both A and E units, but E instructions can only be executed in E units. Accordingly, A-type execution units can be a subset of E-type execution units.

In one embodiment, in order to perform scheduling for asymmetric execution units, the scheduler fills up the A execution unit ports first and then fills up the E execution unit ports with all the other instruction blocks that are not selected by the A execution units. In one embodiment, the scheduler comprises "Find-8" and "Find-4" logic circuitry. The Find-8 circuitry searches the dispatch range in the scheduler for the first eight oldest instructions that meet the select criteria. The Find-4 circuitry, meanwhile, is employed in parallel with the Find-8 circuitry for searching for the first four oldest A-type instructions blocks. The results of the Find-4 circuitry is used to schedule the A-type execution units. Of the remaining instructions that were not already selected by the Find-4 circuitry, the oldest four are then scheduled for the E-type execution units. For example, if the Find-8 circuitry selects 3 A and 5 E-type instructions and the Find-4 circuitry selects the 3 A-type instructions (the same 3 A-type instructions selected by the Find-8 logic), then the 3 A-type instructions are scheduled for the A ports while the oldest 4 of the remaining 5 E-type instructions can be scheduled for the E ports. The present invention is not restricted to this embodiment, however. If, for example, a scheduler can dispatch 16 instructions in a cycle, then "Find-16" and Find-8" logic circuitry would be employed in parallel, and so forth.

Accordingly, embodiments of the present invention have the advantage of high dispatch efficiency because they will try to fill up both A-type and E-type ports. Additionally, embodiments of the present invention have better overall age prioritization between both types of blocks. Finally, because the Find-8 and Find-4 circuitry are employed in parallel, embodiments of the present invention also maintains competitive latency in performing the scheduling procedure.

In one embodiment, a method for performing instruction scheduling in an out-of-order microprocessor pipeline is disclosed. The method comprises selecting a first set of instructions to dispatch from a scheduler, wherein the scheduler is operable to dispatch two types of instructions, and wherein the execution module comprises two types of execution units. The first type of execution unit executes both a first type of instruction and a second type of instruction and the second type of execution unit executes only the second type of instruction. The method also comprises selecting a second set of instructions to dispatch, wherein the second set is a subset of the first set, and wherein the second set comprises only instructions of the second type. Next, the method comprises determining a third set of instructions, wherein the third set of instructions is a subset of the first set of instructions, and wherein the third set comprises instructions not selected as part of the second set. Finally, the method comprises dispatching the second set of instructions to the execution module for execution using the second type of execution unit and further dispatching the third set of instructions to the execution module for execution using the first type of execution unit.

In another embodiment, a processor unit configured to perform a method for scheduling instructions in an out-of-order microprocessor pipeline is disclosed. The method comprises selecting a first set of instructions to dispatch from a scheduler, wherein the scheduler is operable to dispatch two types of instructions, and wherein the execution module comprises two types of execution units. The first type of execution unit executes both a first type of instruction and a second type of instruction and the second type of execution unit executes only the second type of instruction. The method also comprises selecting a second set of instructions to dispatch, wherein the second set is a subset of the first set, and wherein the second set comprises only instructions of the second type. Next, the method comprises determining a third set of instructions, wherein the third set of instructions is a subset of the first set of instructions, and wherein the third set comprises instructions not selected as part of the second set. Finally, the method comprises dispatching the second set of instructions to the execution module for execution using the second type of execution unit and further dispatching the third set of instructions to the execution module for execution using the first type of execution unit.

In a different embodiment, an apparatus configured to perform a method for scheduling instructions in an out-of-order microprocessor pipeline is disclosed. The apparatus comprises a memory, a processor communicatively coupled to the memory, wherein the processor is configured to process instructions out of order. The processor is further configured to: (a) select a first set of instructions to dispatch from a scheduler to an execution module, wherein the scheduler is operable to dispatch two types of instructions, wherein the execution module comprises two types of execution units, wherein a first type of execution unit executes both a first type of instruction and a second type of instruction and wherein a second type of execution unit executes only the second type of instruction; (b) select a second set of instructions to dispatch from the scheduler, wherein the second set is a subset of the first set, and wherein the second set comprises only instructions of the second type; (c) determine a third set of instructions, wherein the third set of instructions is a subset of the first set of instructions, and wherein the third set comprises instructions not selected as part of the second set; and (d) dispatch the second set of instructions to the execution module for execution using the second type of execution unit and further dispatching the third set of instructions to the execution module for execution using the first type of execution unit.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 5 is a table illustrating a scheme for scheduling instructions for asymmetric execution units with a scheduler that dispatches 8 instructions per cycle in accordance with embodiments of the present invention.

DETAILED DESCRIPTION OF THE INVENTION

Figure 1:
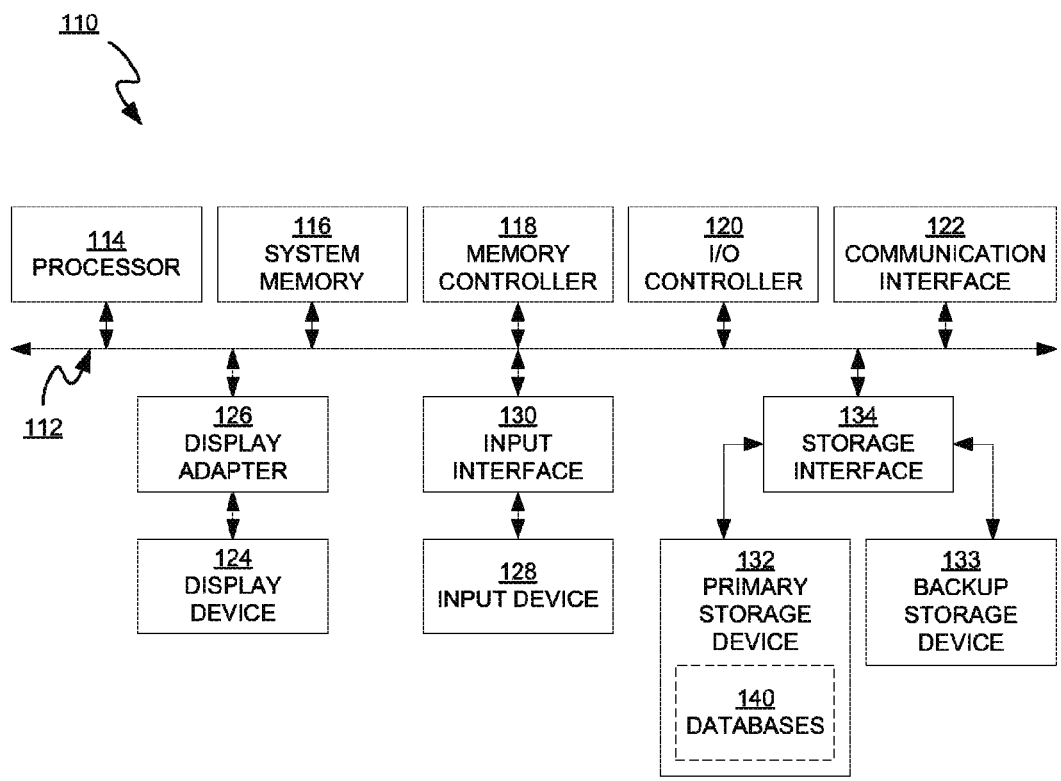
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.
Notation and Nomenclature Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "selecting," "dispatching," determining," "storing," "issuing," "determining," "validating" or the like, refer to actions and processes (e.g., flowchart 600 of FIG. 6) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of being integrated with a processor 114 of an embodiment of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. In one embodiment, processor 114 may be an out of order microprocessor. In a different embodiment, processor 114 may be a superscalar processor. In yet another embodiment, processor 114 may comprise multiple processors operating in parallel.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110.

For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Method and Apparatus for Efficient Scheduling for Asymmetrical Execution Units

Embodiments of the present invention provide a method and apparatus wherein an execution unit can execute multiple types of instructions, e.g., both A and E-types of instructions. Further, embodiments of the present invention provide more efficient scheduling for asymmetrical execution units, which optimizes dispatch throughput, prioritizes older instruction blocks over younger ones, and maintains a competitive latency.

Embodiments of the present invention support asymmetric execution unit types, A and E, wherein an A-type execution unit can support only A-type instructions, but an E-type execution unit can support both A and E-types of instructions. Accordingly, A-type instructions can be executed in both A and E units, but E instructions can only be executed in E units. A-type execution units can, therefore, be considered a subset of E-type execution units.

In one embodiment, the scheduler fills up the A execution unit ports first and then fills up the E execution unit ports with all the other instruction blocks that are not selected by the A execution units. In one embodiment, the scheduler comprises "Find-8" and "Find-4" logic circuitry. The Find-8 circuitry searches the dispatch range in the scheduler for the first eight oldest instructions that meet the select criteria. The Find-4 circuitry, meanwhile, is employed in parallel with the Find-8 circuitry for searching for the first four oldest A-type instructions blocks. The results of the Find-4 circuitry is used to schedule the A-type execution units. Of the remaining instructions that were not already selected by the Find-4 circuitry, the oldest four are then scheduled for the E-type execution units. For example, if the Find-8 circuitry selects 3 A and 5 E-type instructions and the Find-4 circuitry picks the 3 A-type instructions (also selected by the Find-8 logic), then the 3 A-type instructions are scheduled for the A ports while the oldest 4 of the remaining 5 E-type instructions are scheduled for the E ports. The present invention is not restricted to this embodiment, however. If, for example, a scheduler can dispatch 16 instructions in a cycle, then "Find-16" and Find-8" logic circuitry would be employed in parallel, and so forth.

Accordingly, embodiments of the present invention have the advantage of high dispatch efficiency because they will try to fill up both A-type and E-type ports. Additionally, embodiments of the present invention have better overall age prioritization between both types of blocks. Finally, because the Find-8 and Find-4 circuitry are employed in parallel, embodiments of the present invention also maintains competitive latency in performing the scheduling procedure.

Figure 2:
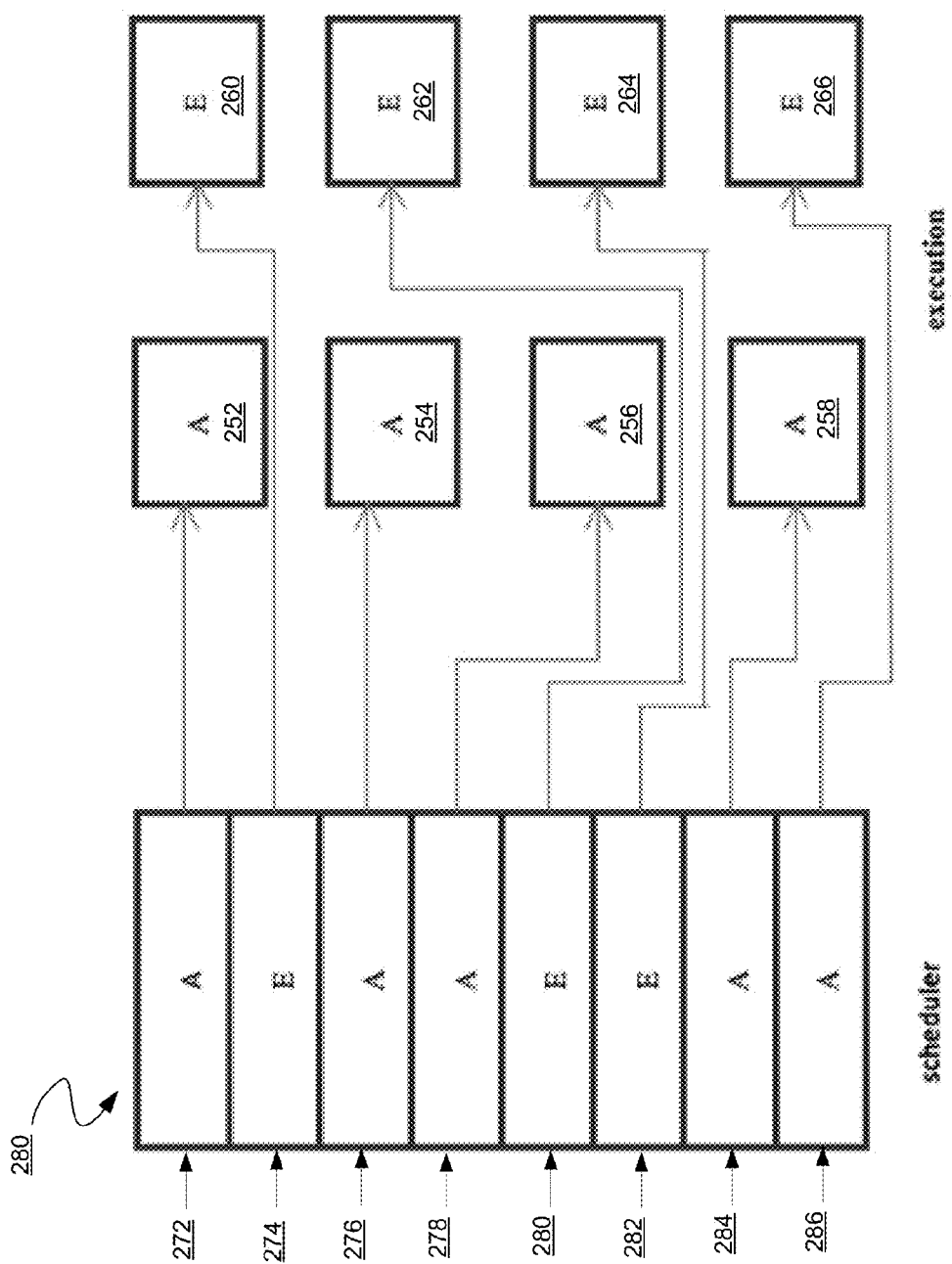
FIG. 2 illustrates an example of the manner in which non-uniform instructions can be selected for asymmetric execution units.

FIG. 2 illustrates an example of the manner in which non-uniform instructions can be selected for asymmetric execution units. A-type instructions can be executed in both A and E units, but E instructions can only be executed in E units. Accordingly, as mentioned above, A-type execution units can be considered a subset of E-type execution units. FIG. 2 illustrates an example of how non-uniform instructions can be selected for asymmetric execution units. Instructions 272, 276, 278, 284 and 286 are A-type instructions while instructions 274, 280, and 282 are E-type instructions. Scheduler 280 dispatches the instructions to asymmetric execution units, wherein execution units 252, 254, 256 and 258 are A-type execution units while 260, 262, 264 and 266 are E-type execution units. Scheduler 280 comprises 5 A-type instructions and 3 E-type instructions. All of the E-type instructions execute only in E-type execution units while A-type instructions are dispatched to both A-type and E-type execution units. For example, as shown in FIG. 2, instruction 284, an A-type instruction, is executed in execution unit 258, an A-type execution unit, while instruction 286, also an A-type instruction, is executed in execution unit 266, an E-type execution unit.

As mentioned above, examples of A-type instruction are integer operations such as add and subtract operations while examples of E-type instructions are floating point operations such as floating point add, floating point subtract, and floating point multiply. Accordingly, E-type execution units can be altered slightly, in accordance with embodiments of the present invention, to support A-type instructions. Doing so makes the E-type execution units slightly more logically complex, however, the penalty paid is minimal and is outweighed by the benefits gained in terms of flexibility and latency.

Figure 3:
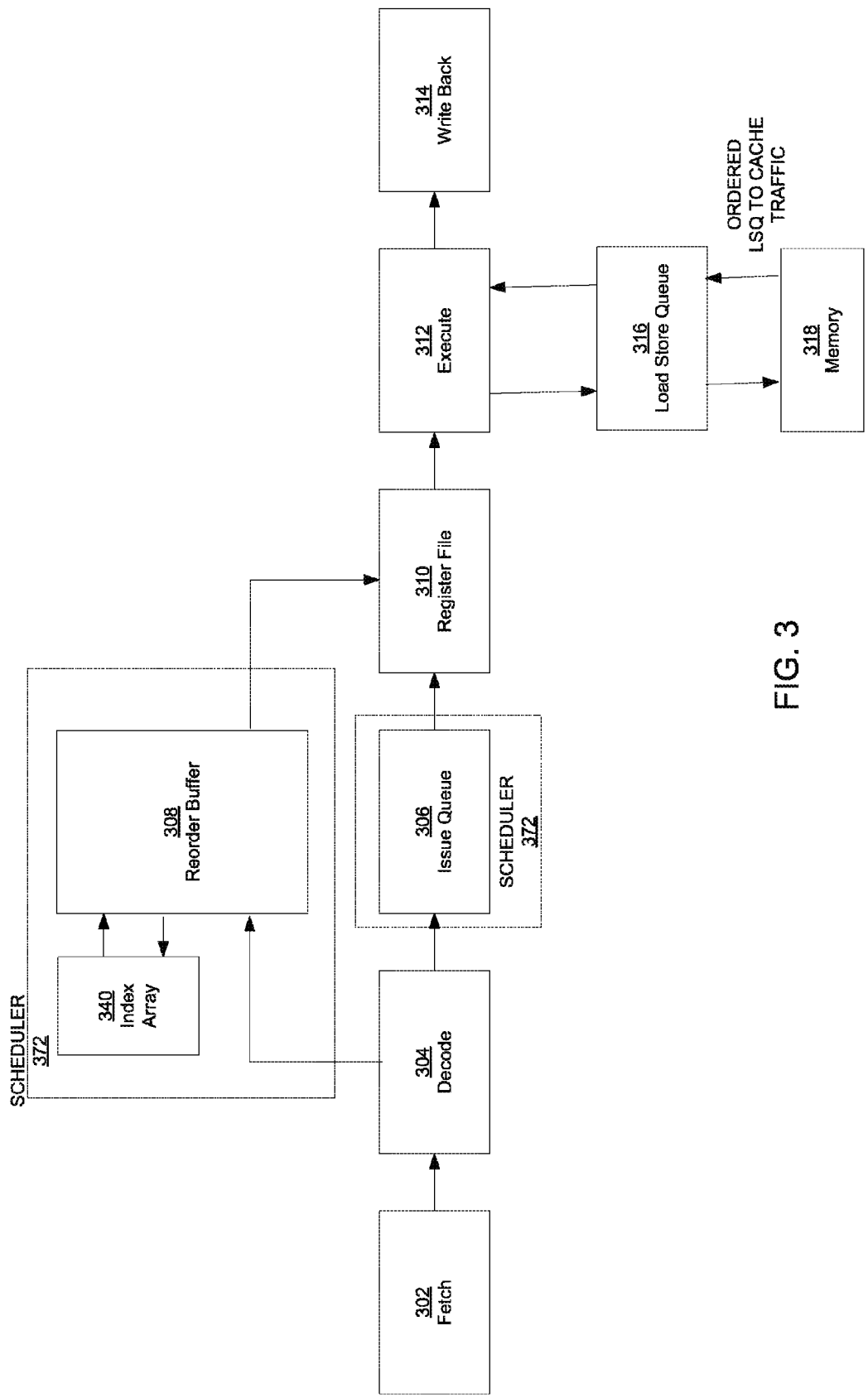
FIG. 3 is an exemplary diagram of a pipeline for an out of order microprocessor on which embodiments of the present invention can be implemented in accordance with one embodiment of the present invention.

FIG. 3 is an exemplary diagram of a pipeline for an out of order microprocessor on which embodiments of the present invention can be implemented in accordance with one embodiment of the present invention.

As illustrated in FIG. 3, instructions are fetched at the fetch stage 302 and place in the instruction fetch queue (IFQ) (not shown) within the fetch stage 302. These instructions reference the architectural registers, which are stored in register file 310. After the instructions are dispatched from the fetch unit 302, they are decoded by decode module 304 and are placed in the ROB 308 and issue queue 306 (IQ). In one embodiment of the present invention, the scheduler module 372 comprises the ROB 308 and IQ 306. As instructions are issued out of IQ 306 out of order using scheduler module 372, they are executed by execute module 312.

As discussed above, in one embodiment of the present invention, the execute module 312 comprises asymmetrical execution units, A and E, wherein an A-type execution unit can support only A-type instructions, but an E-type execution unit can support both A and E-types of instructions. Accordingly, A-type instructions can be executed in both A and E units, but E instructions can only be executed in E units. Accordingly, A-type execution units can be a subset of E-type execution units.

The write back module 314, in one embodiment, can write the resulting values from those instructions back to the temporary registers in ROB 308 first. The ROB 308 keeps track of the program order in which instructions entered the pipeline and for each of these instructions, the ROB maintains temporary register storage in physical register file 380. The physical register file, in one embodiment of the present invention, is allocated dynamically as instructions are dispatched from the scheduler. Because the physical register file is allocated as the instructions are dispatched, it is not in age order. The physical register file stores out of order entries and waits for them to be retired in order to the architectural register file 310.

When the oldest instructions in the ROB produce a valid result, those instructions can be safely committed. That is, the results of those instructions can be made permanent since there is no earlier instruction that can raise a mispredict or exception that may undo the effect of those instructions. When instructions are ready to be committed, the ROB 308 will move the corresponding values in the temporary registers for those instructions to the architectural register file 310. Therefore, through the ROB's in-order commit process, the results in the register file 310 are made permanent and architecturally visible.

The instructions issued out of order from the IQ 306 may also comprise loads and stores. When loads and stores are issued out of order from the IQ 306, there are memory dependencies between them that need to be resolved before those instructions can be committed. Accordingly, the load and stores instructions are stored in a Load Store Queue (LSQ) 316 while the dependencies between them are resolved with the help of ROB 308 before their resulting values can be committed to memory 318.

Figure 4:
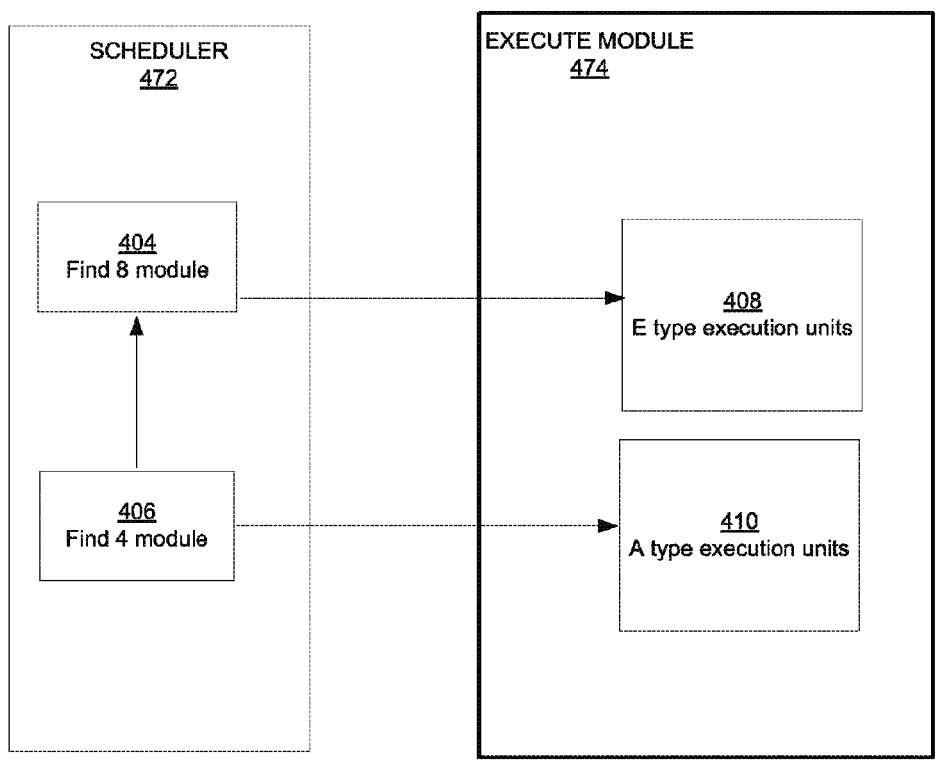
FIG. 4 is a block diagram illustrating a scheme for scheduling instructions for asymmetric execution units in accordance with embodiments of the present invention.

FIG. 4 is a block diagram illustrating a scheme for scheduling instructions for asymmetric execution units in accordance with embodiments of the present invention.

There are several ways to schedule instructions for asymmetric execution units. One way, discussed above, is to pick A-type instructions for A-type execution units and E-type instructions for E-type execution units. The deficiencies of this type of primitive scheduling scheme were previously discussed.

Another way to schedule instructions would be to select E-type instructions first to fill up the E-type execution units and if there are not enough E-type instruction blocks, select more A-type instruction blocks to fill up the E units and then the A units. The first problem with this scheme is that the two step procedure has to be performed in a serial manner, which means it is not latency friendly. Secondly, this procedure does not have overall age prioritization. For example, in certain cases this procedure would pick younger E instructions to fill up the E execution units over older A instructions.

Finally, a third way to schedule instructions would be to (a) fill up the A execution ports first and, subsequently, (b) fill up the E ports with all the other instruction blocks that were not picked by the earlier step. In other words, this procedure would give priority to the first A-type instruction blocks, e.g., in a scheduler dispatching 8 instructions per cycle and comprising 4 A-type execution units, it would give priority to the first 4 A-type instruction blocks. Because the E execution units can take either A or E-types of instructions, they can be filled after attempting to fill the A-type execution units.

This procedure has high efficiency because it will try to fill up both types of execution ports, A and E. It performs well in terms of overall age prioritization between both types of blocks. Although, it may appear that it is giving A-type blocks too much priority when the A-type blocks are younger than the E-type blocks, however, this is not the case. For example, in a scheduler that can dispatch 8 instructions in a cycle and comprises 4 A-type and 4 E-type execution units, only up to 4 of the E-type instruction blocks can be selected. As a result, it is irrelevant whether the fifth E-type block or beyond have older ages over the A-type blocks. They simply cannot be picked. In other words, since only 4 E-type instructions can be picked in any given cycle, it does not affect the overall age prioritization if the procedure fills up the A execution ports first.

In order to maximize the dispatch opportunity, embodiments of the present invention are, therefore, configured to schedule the A ports first and then the E ports in accordance with the third way detailed above. However, one drawback of this procedure is that it is not timing friendly because of the two-step implementation. This is a problem because the dispatch search logic is latency critical in a higher performance processor. In order to address this issue, embodiments of the present invention parallelize certain steps in the procedure as will be discussed below.

FIG. 4 is a block diagram illustrating a scheme for scheduling instructions for asymmetric execution units in accordance with embodiments of the present invention. In order to parallelize the procedure discussed above, a Find-4 logic structure 406 is configured in parallel with a Find-8 logic 404 in scheduler 472. The Find-8 logic is a structure operable to select the first eight oldest instructions to be dispatched that meets the select criteria. The Find-4 logic structure is operable to select the first four oldest instructions to be dispatched that meet the select criteria.

The Find-8 structure 404 searches through the dispatch range in the scheduler for 8 candidates. The criterion used is the ready-bit of the instruction candidates. If the ready bit is set, the instruction is ready to be dispatched. Masking out the E-type instructions, Find-4 structure 406 searches through the dispatch range for 4 A-type blocks. This is performed in parallel with the Find-8 operation. The Find-4 logic is similar to the Find-8 logic, except for the additional criterion that it searches only for the A-type instruction blocks. Both Find-8 and Find-4 logic structures search for the highest priority blocks in the dispatch range. In one embodiment, the logic structures use the Re-Order Buffer ID (ROB IB) of the instructions to determine priority. In another embodiment, an index number may be assigned to each entry in the scheduler that can be used to determine priority as well.

The result from the Find-4 module 406, which masks out the E-type instructions and selects only the A-type instructions, are transmitted over to the A-type execution units 410 in Execute Module 474. In other words, the Find-4 module 406 masks out the E-type instructions and searches through the dispatch range for 4 A-type blocks. Meanwhile, the Find-8 module 404 selects the oldest 8 instructions, both A and E-types, in parallel with the Find-4 module 406. The results from the Find-4 structure 406 are then used by the Find-8 module 404 to dispatch the oldest of the remaining instructions, which were not selected by the Find-4 structure 406, to the E-type execution units 408. In other words, the instructions selected by the Find-4 structure 406 are masked out of the instructions selected by the Find-8 module 404 and the oldest 4 of the remaining instructions are dispatched to the E-type execution units 408. The net effect of this procedure then is to prioritize an older A-type block over an E-type block.

For example, the Find-8 module 404 may select 5 A-type instructions and 3 E-type instructions that it determines to be the highest priority instruction. The Find-4 module 406 in this instance would pick the oldest 4 of the 5 A-type instructions to be dispatched to the A-type execution units 410. Those 4 oldest A instructions will then be masked out from the set of instructions selected by the Find-8 module 404. The remaining 3 E-type instructions and the 1 youngest A-type instruction will then be dispatched to the E-type execution units 408.

By way of another example, the Find-8 module 404 may select 3 A-type instructions and 5 E-type instructions that it determines to be the highest priority instruction. The Find-4 module 406 in this instance would pick the 3 A-type instructions to be dispatched to the A-type execution units 410. Those 3 A instructions will then be masked out from the set of instructions selected by the Find-8 module 404. Of the remaining 5 E-type instructions selected by the Find-8 module, the oldest 4 E-type instructions will be selected to be dispatched to the E-type execution units 408.

In one embodiment, the index number or ROB ID used to prioritize instructions in the scheduler is also used to calculate port numbers for the execution units used to execute the instructions within Execute module 474.

Parallelizing the operations using a Find-4 module in conjunction with a Find-8 module results in considerable time saving. As mentioned before, basic dispatch search logic is latency critical in a high performance processor. For example, if the filling up of the A execution ports followed by the filling up of the E execution ports was serialized, each operation may take up 1 ns, resulting in dispatch search logic that takes 2 ns. By parallelizing the Find-8 operation which, for example, may take 1.2 ns with the Find-4 operation, which may take 1 ns, an embodiment of the present invention may save 0.8 ns during dispatch in each cycle, which is significant from a processor design perspective. Further, the amount of time the masking operation to separate the results of the Find-4 structure from the results of the Find-8 structure takes is not significant compared to the latency of the Find-4 or Find-8 operations themselves.

FIG. 5 is a table illustrating a scheme for scheduling instructions for asymmetric execution units with a scheduler that dispatches 8 instructions per cycle in accordance with embodiments of the present invention. As mentioned above, while the example is based on a scheduler that selects and dispatches 8 instructions per cycle, embodiments of the present invention can be easily scaled to fit the requirements of schedulers that dispatch more or fewer than 8 instructions.

The instructions 572 through to 599 are in order of priority based on their ROB ID number or any another index number maintained to order and prioritize the instructions. The Find-8 module searches for the 8 most high priority (or oldest) instructions that have their ready bit set. Accordingly, the Find-8 module selects instructions 572, 574, 576, 578, 580, 588, 590 and 592, as indicated by a count value of 0 to 7 respectively in the table of FIG. 5. The instructions with their ready bit unasserted, e.g. 582, 584 and 586, are ignored. Further, instructions beyond the highest priority 8, e.g. instructions 594, 596, 598 and 599 are ignored.

As mentioned above, Find-4 logic searches through the dispatch range for A-type blocks and saturates the count if more than 4 are found. As shown in column 3 of the table in FIG. 5, after selecting the first 4 A-type instructions, 572, 574, 580 and 590, the Find-4 module saturates and cannot select the final A-type instruction 592 that was also selected by the Find-8 module. As explained above, the fifth A-type instruction is transmitted for scheduling in an E-type execution unit 408.

As shown in Column 4 of the table in FIG. 5, a mask for A-type instructions is employed for the Find-4 logic module to be able to select the A-type instructions. This mask enables the Find-4 module to select the first four A-type instructions (572, 574, 580 and 590) within the Find-8 Count range (as shown in Column 2) of 0 to 7.

Further, as shown in Column 5, a mask is used for E-type instructions—the mask also picks up A-type instructions that were not selected by the Find-4 module. This mask is employed by the Find-8 module to determine the instructions it should dispatch to the E execution units. Accordingly, the instructions masked by this mask are 3 E-type instructions in the 0 to 7 count range, 576, 578 and 588, and a single A-type instruction 592, which was not selected by the Find-4 module because it had already saturated.

Figure 6:
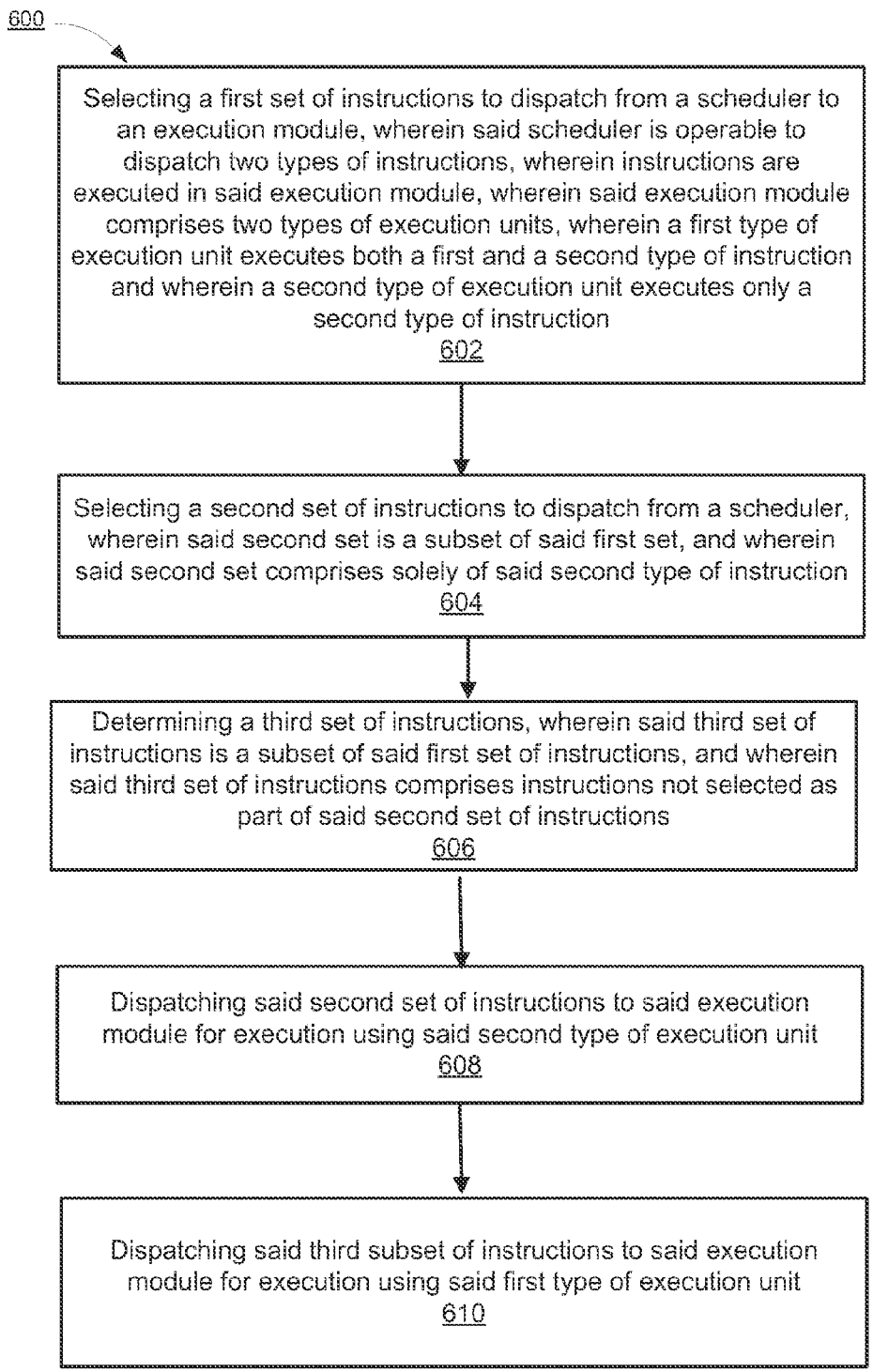
FIG. 6 depicts a flowchart for an exemplary computer controlled process for instruction scheduling in an out of order micro-architecture in accordance with embodiments of the present invention.

FIG. 6 depicts a flowchart for an exemplary computer controlled process for instruction scheduling in an out of order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments.

At step 602, a first set of instructions are selected to be dispatched from the scheduler 472 to an execute module 474. In one embodiment, a Find-8 structure 404 can select up to 8 high priority instructions to be dispatched at a time from the scheduler. As discussed above, the scheduler is operable to dispatch two types of instructions, A and E. The execution module comprises two types of execution units also, wherein A-type execution units can only execute A-type instructions while E-type execution units can execute both A and E-type of instructions.

At step 604, another find and select module, e.g., a Find-4 module 406 can be configured to select a second set of instructions to dispatch from the scheduler. The second set of instructions is a subset of the first set of instructions, e.g., the Find-4 module selects 4 instructions, which are a subset of the 8 instructions selected by the Find-8 module. However, the second subset comprises solely of one type of instruction, e.g., the A-type of instruction.

At step 606, a third set of instructions is determined which comprises instructions in the first set of instructions that were not picked by the second set of instructions.

At step 608, the second set of instructions is dispatched for execution using the second type of execution unit. For example, the Find-4 structure dispatches the A-type of instructions for execution in the A-type of execution units. And, finally, at step 610, the third set of instructions is dispatched to the execution module for execution in the first type of execution unit. For example, the Find-8 module dispatches instructions not picked by the Find-4 module for execution in the E-type of execution units.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for scheduling instructions in an out-of-order microprocessor pipeline, said method comprising:

selecting a first set of instructions to dispatch from a scheduler to an execution module, wherein said scheduler is operable to dispatch two types of instructions, wherein said execution module comprises two types of execution units, wherein a first type of execution unit executes both a first type of instruction and a second type of instruction and wherein a second type of execution unit executes only said second type of instruction;

selecting a second set of instructions to dispatch from said scheduler, wherein said second set is a subset of said first set, and wherein said second set comprises only instructions of said second type;

determining a third set of instructions, wherein said third set of instructions is a subset of said first set of instructions, and wherein said third set comprises instructions not selected as part of said second set, wherein said third set comprises said first type of instructions and said second type of instructions; and dispatching said second set of instructions to said execution module and executing said second set of instructions in said execution module using said second type of execution unit and further dispatching said third set of instructions to said execution module and executing said third set of instructions in said execution module using said first type of execution unit.

2. The method of claim 1, wherein said first type of instruction is selected from a group consisting of: floating point add, floating point subtract, and floating point multiply.

3. The method of claim 1, wherein said second type of instruction is selected from a group consisting of: integer add and integer subtract.

4. The method of claim 1, wherein said selecting a first set of instructions and said selecting a second set of instructions are performed in parallel.

5. The method of claim 1, wherein said first set, said second set, and said third set of instructions are selected based on age priority, wherein said age priority is determined on the basis of a value selected from a group consisting of: a Re-Order Buffer ID (ROB ID) number and an index number assigned to each instruction in said scheduler.

6. The method of claim 5, wherein said value is used to determine a port number for a corresponding execution unit.

7. A processor unit configured to perform a method for scheduling instructions in an out-of-order microprocessor pipeline, said method comprising:

selecting a first set of instructions to dispatch from a scheduler to an execution module, wherein said scheduler is operable to dispatch two types of instructions, wherein said execution module comprises two types of execution units, wherein a first type of execution unit executes both a first type of instruction and a second type of instruction and wherein a second type of execution unit executes only said second type of instruction;

selecting a second set of instructions to dispatch from said scheduler, wherein said second set is a subset of said first set, and wherein said second set comprises only instructions of said second type;

determining a third set of instructions, wherein said third set of instructions is a subset of said first set of instructions, and wherein said third set comprises instructions not selected as part of said second set, wherein said third set comprises said first type of instructions and said second type of instructions; and dispatching said second set of instructions to said execution module and executing said second set of instructions in said execution module using said second type of execution unit and further dispatching said third set of instructions to said execution module and executing said third set of instructions in said execution module using said first type of execution unit.

8. The processor unit as described in claim 7, wherein said first type of instruction is selected from a group consisting of: floating point add, floating point subtract, and floating point multiply.

9. The processor unit as described in claim 7, wherein said second type of instruction is selected from a group consisting of: integer add and integer subtract.

10. The processor unit as described in claim 7, wherein said selecting a first set of instructions and said selecting a second set of instructions are performed in parallel.

11. The processor unit as described in claim 7, wherein said first set, said second set, and said third set of instructions are selected based on age priority, wherein said age priority is determined on the basis of a value selected from a group consisting of:
a Re-Order Buffer ID (ROB ID) number and an index number assigned to each instruction in said scheduler.

12. The processor unit as described in claim 11, wherein said value is used to determine a port number for a corresponding execution unit.

13. An apparatus configured to perform a method for scheduling instructions in an out-of-order microprocessor pipeline, said apparatus comprising:

a memory;

a processor communicatively coupled to said memory, wherein said processor is configured to process instructions out of order, and further wherein said processor is configured to:

select a first set of instructions to dispatch from a scheduler to an execution module, wherein said scheduler is operable to dispatch two types of instructions, wherein said execution module comprises two types of execution units, wherein a first type of execution unit executes both a first type of instruction and a second type of instruction and wherein a second type of execution unit executes only said second type of instruction;

select a second set of instructions to dispatch from said scheduler, wherein said second set is a subset of said first set, and wherein said second set comprises only instructions of said second type;

determine a third set of instructions, wherein said third set of instructions is a subset of said first set of instructions, and wherein said third set comprises instructions not selected as part of said second set, wherein said third set comprises said first type of instructions and said second type of instructions; and dispatching said second set of instructions to said execution module and executing said second set of instructions in said execution module using said second type of execution unit and further dispatching said third set of instructions to said execution module and executing said third set of instructions in said execution module using said first type of execution unit.

14. The apparatus of claim 13, wherein said first type of instruction is selected from a group consisting of: floating point add, floating point subtract, and floating point multiply.

15. The apparatus of claim 13, wherein said second type of instruction is selected from a group consisting of: integer add and integer subtract.

16. The apparatus of claim 13, wherein said selecting a first set of instructions and said selecting a second set of instructions are performed in parallel.

17. The apparatus of claim 13, wherein said first set, said second set, and said third set of instructions are selected based on age priority, wherein said age priority is determined on the basis of a value selected from a group consisting of: a Re-Order Buffer ID (ROB ID) number and an index number assigned to each instruction in said scheduler.

* * * * *